United States Patent [19]

Watanuki

[11] 4,432,167
[45] Feb. 21, 1984

[54] CORNER COVER FOR A WINDOW

[75] Inventor: Yoshio Watanuki, Zama, Japan

[73] Assignee: Nissan Motor Company, Limited, Yokohama, Japan

[21] Appl. No.: 384,587

[22] Filed: Jun. 3, 1982

[30] Foreign Application Priority Data

Jun. 24, 1981 [JP] Japan .................................. 56-98049

[51] Int. Cl.³ .............................................. B60J 5/04
[52] U.S. Cl. .................................................... 49/502
[58] Field of Search ................... 49/502, 374, 375, 348

[56] References Cited

FOREIGN PATENT DOCUMENTS 2627809 1/1978 Fed. Rep. of Germany ........ 49/502
53-73726 6/1978 Japan ..................................... 49/502

*Primary Examiner*—Kenneth Downey
*Attorney, Agent, or Firm*—Lane, Aitken & Kananen

[57] ABSTRACT

A corner cover for a window unit having a window frame which forms an opening with a corner, includes a panel and an outer member. The panel is attached to the window frame in such a manner as to cover the corner of the opening. The panel and the window frame form a recess. An outer member extends over the panel to cover one surface of the latter. A flange is formed on the outer member and fits into the recess. A hooked portion is formed on the outer member and clamps part of the panel. The recess, the flange and the hooked portion are designed so that the outer member can be attached to the panel by moving the outer member along the panel in one direction only. The panel and the outer member include a mechanism which limits movement of the outer member from its attached position in the direction opposite that of movement of attaching the outer member to the panel in order to prevent detachment of the outer member from the panel.

11 Claims, 4 Drawing Figures

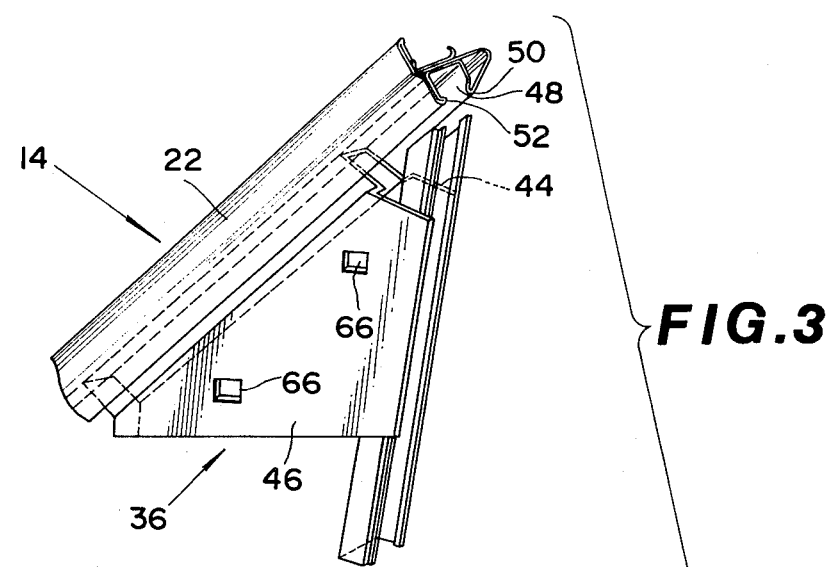
FIG. 3
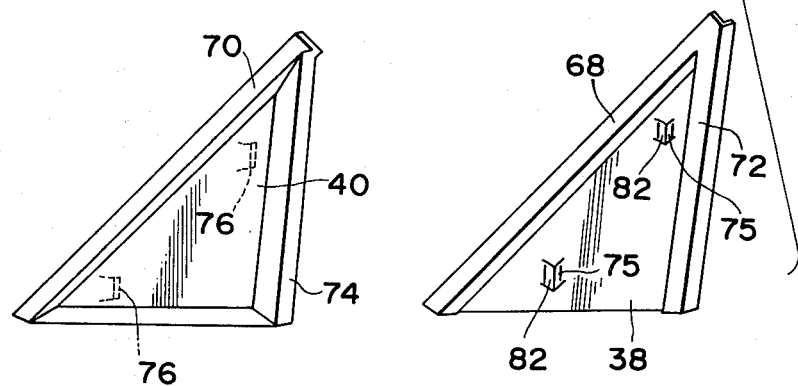
FIG. 4
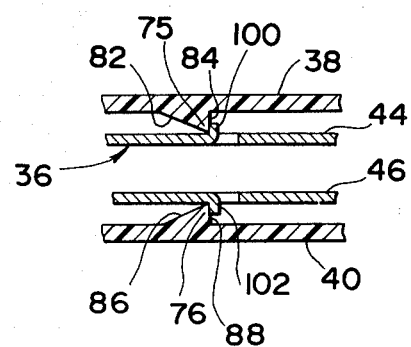

CORNER COVER FOR A WINDOW

BACKGROUND OF THE INVENTION

This invention relates to a corner cover for a window, and more particularly to a device for covering the corner of a window, for example, to reduce the size of required window glazing.

A corner cover is usually attached to the front door of an automotive vehicle in such a manner as to cover the lower front corner of the window of the door. The purpose of the corner cover is to allow a reduction of the size of window glazing to reduce the cost thereof, and thus should be made of inexpensive material. In addition, it is important for the corner cover to be easy to assemble.

SUMMARY OF THE INVENTION

It is an object of this invention to provide a corner cover for a window which can be easily assembled.

In accordance with this invention, a corner cover for a window unit having a window frame which forms an opening with a corner, includes a panel and an outer member. The panel is attached to the window frame in such a manner as to cover the corner of the opening. The panel and the window frame form a recess. The outer member extends over the panel to cover one surface of the latter. A flange is formed on the outer member and fits into the recess. A hooked portion is formed on the outer member and clamps part of the panel. The recess, the flange and the hooked portion are designed so that the outer member can be attached to the panel by moving the outer member along the panel in one direction only. The panel and the outer member include a mechanism which limits movement of the outer member from its attached position in the direction opposite that of movement of attaching the outer member to the panel in order to prevent detachment of the outer member from the panel.

The above and other objects, features and advantages of this invention will be apparent from the following description of preferred embodiments thereof, taken in conjunction with the drawings.

BRIEF DESCRIPTION OF THE DRAWINGS

FIG. 3 is an exploded view of the corner cover of FIGS. 1 and 2; and

FIG. 4 is a cross-sectional view similar to FIG. 2 and illustrates a corner cover according to a second embodiment of this invention.

DESCRIPTION OF THE PREFERRED EMBODIMENTS

Figure 1:
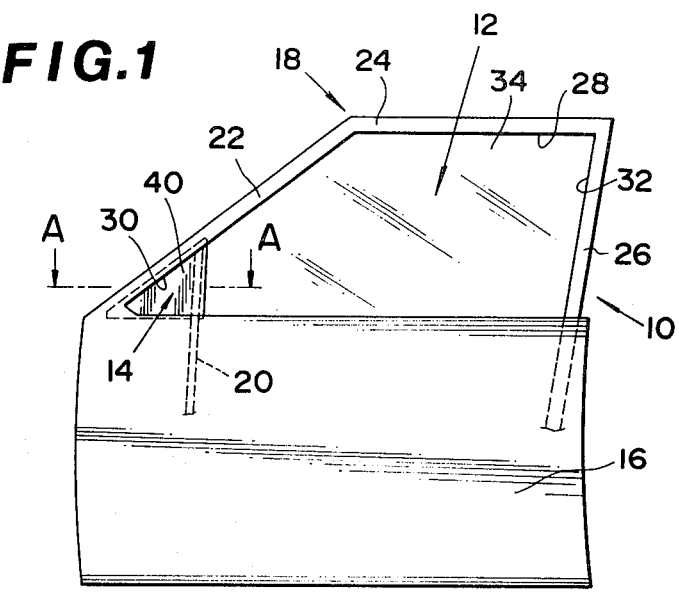
FIG. 1 is a side view of an automotive vehicle front door with a window having a corner cover according to a first embodiment of this invention.

With reference to FIG. 1, there is shown an automotive vehicle front door 10, which has a window 12 and a corner cover 14 according to a first embodiment of this invention. The door 10 also includes a rectangular panel 16, an upper sash 18, and a front lower sash 20. The upper sash 18 has slanted, horizontal, and vertical portions 22, 24, and 26, respectively. The slanted sash 22 extends from the front upper corner of the panel 16 to the front end of the top horizontal sash 24. The vertical sash 26 extends from the rear upper corner of the panel 16 to the rear end of the top horizontal sash 24. The upper sash 18 and the horizontal top edge of the panel 16 define an opening 28, and thus form a frame thereof. The slanted sash 22 and the top edge of the panel 16 define an acute-angle corner of the opening 28.

The front lower sash 20 extends vertically from the panel 16 to a point in the forward half of the slanted sash 22, and thus extends across the opening 22. As a result, the opening 28 is divided into two sections 30 and 32 in the form of a triangle and an irregular pentagon respectively. The lower sash 20 is far away enough from the front edge of the panel 16 not to interfere with door hinges (not shown). The triangular opening 30 including the acute-angle corner of the opening 28 is covered by the corner cover 14. The pentagonal opening 32 constitutes the window 12, and can be closed by a vertically-movable plate of window glass 34.

Figure 2:
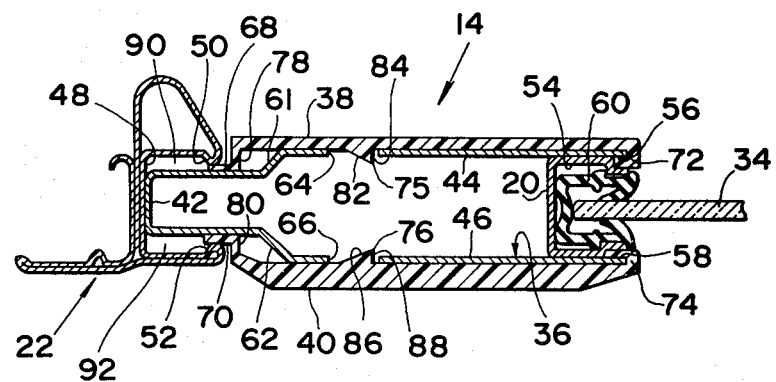
FIG. 2 is a cross-sectional view of the corner cover taken along line A—A of FIG. 1.

As shown in FIGS. 2 and 3, the corner cover 14 includes an inner member 36 and a pair of outer members 38 and 40. The inner member 36 has an elongated base or front panel 42 and a pair of spaced side panels 44 and 46 extending perpendicularly to and integrally from the longitudinal edges of the front panel 42. The side panels 44 and 46 are triangular, essentially conforming to the triangular opening 30. The inner member 36 is attached to the slanted portion 22 of the upper sash 18 and the front lower sash 20 in such a manner that the side panels 44 and 46 cover the triangular opening 30.

The slanted portion 22 of the upper sash 18 is formed with a longitudinally extending groove 48 facing the opening 28 and having a flat-bottomed cross-section. The groove 48 facing the pentagonal opening 32 is adapted to receive the edge of the window glazing 34. The groove 48 facing the triangular opening 30 accommodates the front panel 42 and the edges of the side panels 44 and 46 adjacent to the panel 42. The front panel 42 is spot-welded to the slanted sash 22 at the bottom of the groove 48. The slanted sash 22 has a pair of longitudinally-extending opposed projections 50 and 52 along the entrance of the groove 48 which constrict the groove entrance. The side panels 44 and 46 are spaced from the corresponding projections 50 and 52 at a predetermined distance. In this way, the slanted sash 22 and side panels 44 and 46 form a pair of grooves or recesses 90 and 92 facing the rear in parallel with the side panels 44 and 46.

The front lower sash 20 has a U-shaped cross-section and thus has a groove 54, which faces the pentagonal opening 32. The groove 54 accommodates a resilient rail 60, which receives the sliding edge of the window glass 34. The edges of the side panels 44 and 46 distal from the front panel 42 overlap the respective side walls of the sash 20, and are spot-welded thereto. The side walls of the sash 20 are formed with longitudinally extending steps so as to form longitudinally extending grooves in conjunction with the distal or rear edges of the side panels 44 and 46, respectively. These grooves face the pentagonal opening 32. The steps of the sash 20 cause the rear edges of the side panels 44 and 46 to separate from the sash 20.

The side panels 44 and 46 are provided with opposed oblique steps 61 and 62 respectively at positions relatively near the slanted sash 22 so that the distance between the panels 44 and 46 near the sash 22 will be less than that between the distal portions of the panels 44 and 46. This configuration ensures that the edges of the panels 44 and 46 near the front panel 42 can be inserted into the groove 48 with the proper spacing from the projections 50 and 52 formed to provide the recesses 90 and 92. The side panel 44 has a pair of rectangular apertures 64 between the oblique step 61 and the distal edge of the panel 44. The side panel 46 has a similar pair of rectangular apertures 66.

The outer members 38 and 40 are in the form of triangular plates, substantially conforming to the triangular opening 30. The outer members 38 and 40 overlap the respective side panels 44 and 46 of the inner member 36 in such a manner as to cover them. Specifically, the outer member 38 covers the outer surface of the side panel 44. The outer member 40 covers the outer surface of the side panel 46. The outer members 38 and 40 are made of an inexpensive, resiliently-deformable material, such as a synthetic resin.

A flange 68 is formed along the front edge of the outer member 38. A similar flange 70 is formed on the outer member 40. The flanges 68 and 70 extend parallel to the side panels 44 and 46 and the rests of the outer members 38 and 40, and snugly fit into the recesses 90 and 92 between the side panel 44 and the projection 50, and between the side panel 46 and the projection 52, respectively. In this way, the flanges 68 and 70 are secured to the slanted sash 22 and the inner member 36.

A hooked rim 72 is formed along the rear edge of the outer member 38. The rim 72 has a U-shaped cross-section, defining a groove or recess 56 which faces the front in parallel with the side panel 44 and the outer member 38. A similar but symmetrical rim 74 defining a recess 58 is formed on the outer member 40. The rear edges of the side panels 44 and 46 snugly fit into the respective recesses 56 and 58 to be clamped by the hooked rims 72 and 74. The free edges of the rims 72 and 74 are accommodated in the grooves defined by the side panel 44 and the lower sash 20, and by the side panel 46 and the lower sash 20, respectively. In this way, the rims 72 and 74 are secured to the lower sash 20 and the inner member 36.

The outer member 38 has a pair of projections 75 at positions opposing the respective apertures 64 of the side panel 44, extending into and through the respective apertures 64. A similar pair of projections 76 are formed on the outer member 40, extending into and through the respective apertures 66 of the side panel 46. The projections 75 and 76 thereby engage the respective side panels 44 and 46.

The outer members 38 and 40 are provided with substantially-opposed steps 78 and 80 respectively at positions between the slanted sash 22 and the step 61 of the side panel 44, and between the sash 22 and the step 62 of the side panel 46, respectively, so that the distance between the flanges 68 and 70 will match the spacing between the projections 50 and 52. This configuration ensures that the flanges 68 and 70 are inserted securely into the recesses 90 and 92 defined by the slanted sash 22 and the inner member 36.

The flanges 68 and 70 extend or point frontwards in parallel with the side panels 44 and 46. The recesses 90 and 92 face rearwards in parallel with the panels 44 and 46. The recesses 56 and 58 face frontwards in parallel with the panels 44 and 46. Therefore, frontward displacement of the outer members 38 and 40 along the side panels 44 and 46 allows the flanges 68 and 70, and the rear edges of the panels 44 and 46 to simultaneously enter the recesses 90 and 92, and the recesses 56 and 58, respectively.

Each projection 75 is of triangular cross-section, and has front and rear surfaces 82 and 84 meeting at the distal or top edge of the projection 75. The front surface 82 extends from the base to the distal edge of the projection 75 at a predetermined obtuse angle of preferably more than 135° with respect to the direction toward the front. In other words, the front surface 82 of each projection 75 inclines toward the rear at an obtuse angle with respect to the direction toward the front. The rear surface 84 extends from the base to the distal edge of the projection 75 substantially perpendicularly to the side panel 44. The right-angled surface 84 ensures that the projection 75 securely engages the side panel 44 to stop movement of the outer member 38 when the outer member 38 is subject to rearward forces. In this way, the projections 75 prevent detachment of the outer member 38 from the side panel 44. Similarly but symmetrically, each projection 76 has obtuse-angled front and right-angled rear surfaces 86 and 88. The right-angled rear surface 88 securely engages the side panel 46 to prevent rearward displacement of the outer member 40 from the normal position.

During assembly, after the inner member 36 is welded to the slanted sash 22 and the lower sash 20, the outer member 38 is placed onto the side panel 44 in such a manner as to be offset rearwardly from the latter. Then, the outer member 38 is shifted frontwardly along the side panel 44 to insert the flange 68 into the recess 90 and simultaneously insert the rear edge of the panel 44 into the recess 56. At that time, the obtuse-angled front surface 82 of each projection 75 prevents the projection 75 from interfering with shift or slide of the outer member 38 along the side panel 44, ensuring smooth slide of the outer member 38. As the flange 68 and the rear edge of the panel 44 are inserted into place in the respective recesses 90 and 56, the projections 75 reach the apertures 64 and fall into place. Insertion of the flange 68 and rear edge of the side panel 44 into the respective recesses secures the outer member 38 to the inner member 36, the slanted sash 22, and in turn the lower sash 20. The engagement of the outer member 38 with the inner member 36 by means of the projections 75 limits rearward movement of the outer member 38 to prevent detachment of the outer member 38 from the inner member 36. Similarly, the outer member 40 is attached to the inner member 36, the slanted sash 22, and the lower sash 20.

FIG. 4 shows an essential portion of a corner cover according to a second embodiment of this invention. This embodiment is designed in a manner similar to that of the previous first embodiment except for the design changes detailed below. A side panel 44 of an inner member 36 has a pair of projections 100 formed by bending a tab with a sheet metal punch. Each projection 100 extends laterally toward an outer member 38 at an right angle with respect to the rest of the side panel 44. Each projection 100 engages a right-angled rear surface 84 of a projection 75 of the outer member 38, prohibiting rearward movement of the outer member 38 from the normal position to prevent detachment of the outer member 38 from the inner member 36. An obtuse-angled front surface 82 of each projection 75 allows the outer member 38 to move smoothly along the side panel 44 and over the projection 100 when the outer member 38 is attached to the inner member 36.

Similarly, a side panel 46 of the inner member 36 has a pair of projections 102, which extend laterally toward an outer member 40. Each projection 102 engages a projection 76 of the outer member 40 in a manner similar to that of the engagement of the projections 100 with the projections 74.

It should be understood that further modifications and variations may be made in this invention without departing from the spirit and scope of this invention as set forth in the appended claims.

What is claimed is:

1. A corner cover for a window unit having a window frame which forms an opening with a corner, comprising:
   (a) a panel attached to the window frame and covering the corner of the opening, the panel and the window frame forming a first recess facing in a direction parallel to the panel;
   (b) an outer member covering one surface of the panel;
   (c) a flange formed on the outer member, the flange pointing in the direction opposite that of the first recess and fitting into the first recess to engage the panel;
   (e) a hooked portion formed on the outer member and defining a second recess which faces in the direction opposite that of the first recess, part of the panel fitting into the second recess to engage the hooked portion, whereby the outer member can be attached to the panel by moving the outer member in one direction along the panel from an offset position to insert the flange and the part of the panel into the corresponding recesses; and
   (f) means for preventing movement of the outer member when the outer member would be moved from its attached position in the direction opposite that of attaching movement of the outer member.

2. A corner cover for a window unit having a window frame which forms an opening with a corner, comprising:
   (a) a panel attached to the window frame and covering the corner of the opening, the panel and the window frame forming a first recess facing in a direction parallel to the panel;
   (b) an outer member covering one surface of the panel;
   (c) a flange formed on the outer member, the flnge pointing in the direction opposite that of the first recess and fitting into the first recess to engage the panel;
   (e) a hooked portion formed on the outer member and defining a second recess which faces in the direction opposite that of the first recess, part of the panel fitting into the second recess to engage the hooked portion, whereby the outer member can be attached to the panel by moving the outer member in one direction along the panel from an offset position to insert the flange and the part of the panel into the corresponding recesses;
   (f) a projection formed on the outer member and extending toward the panel; and
   (g) means, formed on the panel, for engaging the projection to prevent movement of the outer member when the outer member would be moved from its attached position in the direction opposite that of attaching movement of the outer member.

3. A corner cover as recited in claim 2, wherein the projection has a surface at the front thereof with respect to the direction of attaching movement of the outer member, the front surface of the projection being inclined at a predetermined obtuse angle with respect to the direction of attaching movement of the outer member, whereby the front surface prevents the projection from interfering with movement of the outer member along the panel when the outer member is attached to the panel.

4. A corner cover as recited in claim 3, wherein the projection has another surface at the rear thereof with respect to the direction of attaching movement of the outer member and the rear surface of the projection extends perpendicularly to the direction of attaching movement of the outer member, and wherein the engaging means is adapted to engage the rear surface of the projection.

5. A corner cover as recited in claim 4, wherein the engaging means has a hole through the panel, and wherein the projection extends into the hole.

6. A corner cover as recited in claim 4, wherein the engaging means has a tab projecting toward the outer member and adapted to abut the rear surface of the projection.

7. A corner cover as recited in claim 3, further comprising an auxiliary frame connected to the window frame in such a manner as to extend across the opening, the panel being attached to the auxiliary frame.

8. A corner cover as recited in claim 3, wherein the flange and the hooked portion are on front and rear edges of the outer member respectively with respect to the direction of attaching movement of the outer member, and wherein the projection is between the flange and the hooked portion.

9. A corner cover as recited in claim 8, wherein the rear edge of the panel fits into the second recess.

10. A corner cover for a window unit having a window frame which forms an opening with a corner, the window frame having a groove facing the opening, the corner cover comprising:
    (a) a base panel attached to the window frame at the bottom of the groove of the window frame;
    (b) parallelly spaced first and second panels connected to the base panel in such a manner as to extend perpendicularly from the opposite edges of the base panel respectively, the first and second panels covering the corner of the opening, the first panel and the window frame forming a first recess facing in a direction parallel to the first panel, the second panel and the window frame forming a second recess facing in a direction parallel to the second panel;
    (c) first and second outer members covering the outer surfaces of the first and second panels respectively;
    (d) a first flange formed on the first outer member, the first flange pointing in the direction opposite that of the first recess and fitting into the first recess to engage the first panel;
    (e) a second flange formed on the second outer member, the second flange pointing in the direction opposite that of the second recess and fitting into the second recess to engage the second panel;
    (f) a first hooked portion formed on the first outer member and defining a third recess which faces in the direction opposite that of the first recess, part of the first panel fitting into the third recess to engage the first hooked portion, whereby the first outer member can be attached to the first panel by moving the first outer member in one direction along the first panel from an offset position to insert the first flange and the part of the first panel into the corresponding recesses;

(g) a second hooked portion formed on the second outer member and defining a fourth recess which faces in the direction opposite that of the second recess, part of the second panel fitting into the fourth recess to engage the second hooked portion, whereby the second outer member can be attached to the second panel by moving the second outer member in one direction along the second panel from and offset position to insert the second flange and the part of the second panel into the corresponding recesses;

(h) a first projection formed on the first outer member and extending toward the first panel;

(i) a second projection formed on the second outer member and extending toward the second panel;

(j) first means, formed on the first panel, for engaging the first projection to prevent movement of the first outer member when the first outer member would be moved from its attached position in the direction opposite that of attaching movement of the first outer member; and (k) a second means, formed on the second panel, for engaging the second projection to prevent movement of the second outer member when the second outer member would be moved from its attached position in the direction opposite that of attaching movement of the second outer member.

11. A corner cover as recited in claim 10, wherein the first projection has a surface at the front thereof with respect to the direction of attaching movement of the first outer member, the front surface of the first projection being inclined at a predetermined obtuse angle with respect to the direction of attaching movement of the first outer member; and wherein the second projection has a surface at the front thereof with respect to the direction of attaching movement of the second outer member, the front surface of the second projection being inclined at a predetermined obtuse angle with respect to the direction of attaching movement of the second outer member.

* * * * *

UNITED STATES PATENT AND TRADEMARK OFFICE
CERTIFICATE OF CORRECTION

PATENT NO. : 4,432,167
DATED : February 21, 1984
INVENTOR(S) : Yoshio Watanuki

It is certified that error appears in the above-identified patent and that said Letters Patent is hereby corrected as shown below:

Column 2, line 8, "22" (second occurrence) should read -- 28 --;

Column 2, line 11, "away enough" should read -- enough away --;

Column 3, line 20, "rests" should be deleted and -- remainders -- inserted therefor; and Column 5, line 3, "74" should read -- 75 --.

Signed and Sealed this

Ninth Day of October 1984

[SEAL]

Attest:

Attesting Officer

GERALD J. MOSSINGHOFF

Commissioner of Patents and Trademarks